Feb. 18, 1969 K. HOWIE, JR 3,428,068

TURBULENCE AMPLIFIER

Filed Feb. 6, 1967 Sheet 1 of 2

INVENTOR:
KENNETH HOWIE, JR.
BY Howson & Howson
ATTYS.

Feb. 18, 1969 K. HOWIE, JR 3,428,068

TURBULENCE AMPLIFIER

Filed Feb. 6, 1967 Sheet 2 of 2

INVENTOR:
KENNETH HOWIE, JR.

BY *Howson & Howson*

ATTYS.

United States Patent Office
3,428,068
Patented Feb. 18, 1969

3,428,068
TURBULENCE AMPLIFIER

Kenneth Howie, Jr., Norristown, Pa., assignor to Howie Corporation, Norristown, Pa., a corporation of Pennsylvania Continuation-in-part of application Ser. No. 543,688, Apr. 19, 1966. This application Feb. 6, 1967, Ser. No. 614,153
U.S. Cl. 137—81.5 9 Claims
Int. Cl. F15c *1/14*

ABSTRACT OF THE DISCLOSURE

A fluid amplifier of the type using changes in the position of the point at which a projected laminar stream becomes turbulent, in which an intermediate conduit having an interior cross-section substantially the same in size and shape as that of the projected laminar stream is disposed between, and spaced from, the usual supply conduit and collector conduit in alignment with the projected laminar stream so that the stream passes through it.

*Cross-reference to related application*

This application is a continuation-in-part of application Ser. No. 543,688 of Kenneth Howie, Jr., filed Apr. 19, 1966 and entitled Fluid-Operated Device.

*Background of the invention*

This invention relates to devices operated by the flow of fluids, and particularly to pure-fluid amplifier and control devices.

There are now available in the art a number of different types of devices which utilize the flow of fluids for amplifier or control purposes. These devices have important advantages in certain applications because of their small size, high reliability, low cost, and imperviousness to various types of radiation which may adversely affect certain other types of devices, particularly semiconductor devices. Forms of such devices which require no mechanical moving parts are commonly known as pure-fluid amplifiers.

One important type of such pure-fluid amplifier known as the turbulence amplifier is described and claimed in U.S. Patent No. 3,234,955 of Raymond N. Auger, issued Feb. 15, 1966, and entitled "Fluid Amplifiers." In this device, a laminar fluid stream is projected from the outlet orifice of a supply tube toward the inlet orifice of a collector tube so as normally to reach said collector orifice in a laminar flow condition. A control stream is applied to the projected stream so as to impinge it at an angle and near the supply orifice. When the flow of the control stream is increased sufficiently, it causes the projected stream to change from laminar flow to turbulent flow before it reaches the collector orifice, without appreciably deflecting it, and as a result the flow rate into the collector orifice falls to a much lower value than existed when the projected stream traveled to the collector orifice entirely by laminar flow. Furthermore, the change in pressure resulting from the change in flow into the collector orifice is greater than the corresponding change in pressure applied to the control stream, and amplification of pressure variations applied to the control stream is therefore obtained. The difference in pressure produced at the collector tube is due to the fact that the collector orifice is of a size to collect a substantial fraction of the projected stream when the stream reaches it entirely by laminar flow, but collects a much smaller fraction of the projected stream when the stream becomes turbulent before reaching the receiver orifice, because of the scattering of the stream due to turbulence. Details of the construction and operation of such turbulence amplifiers and related devices are set forth in detail in the above-cited patent of Auger.

While the turbulence amplifier has been found very satisfactory for many purposes, it has been found that there are practical limitations on the maximum output pressure and flow rate which it can produce at the collector tube. This maximum output pressure and flow rate has been found to be less than that which is required for the direct actuation of the usual, commercially-available pneumatic or hydraulic valves; more particularly, the maximum obtainable output pressure and flow rate are typically only about one-seventh that required to operate conventional pneumatic or hydraulic valves. It will be understood that this limitation is a serious one, since a very important and common use of pure-fluid amplifiers is in systems in which the output is used to control large flows of fluid. Accordingly, in the past it has been necessary to use, between the output of the turblence amplifier and the pneumatic or hydraulic valve, one or more intermediate devices such as a diaphragm-actuated pilot valve, or a small bleed-type valve. This of course adds substantially to the expense of the system and, because of the introduction of mechanical moving parts in the intermediate device, reduces the reliability and longevity of the system, thereby tending to negate two of the important advantages of pure-fluid systems.

In addition, the practical limitation on the output flow rate of known turbulence amplifiers has limited the speed with which the power valve can be operated. It has also limited the time delays which can be provided in time-delay circuits fed from the turbulence amplifier output, for reasons which will be described hereinafter.

The maximum output pressure and flow rates obtainable with known types of turbulence amplifiers depend to some extent upon the particular design of the device. For example, the standard turbulence amplifier may be modified by increasing the diameter of the supply tube so that the flow rate in increased, but this tends to destroy the laminarity of the projected stream and to reduce the efficiency of fluid collection by the collector orifice so that the practical upper limit for the diameter of a supply tube is about 0.040 inch. It is possible to increase the supply pressure for the supply tube, but this causes the point of natural turbulence, which is the point at which the projected stream becomes turbulent even in the absence of the control stream, to move nearer to the supply orifice; for the device to operate, this in turn requires moving the collector orifice nearer to the supply tube. It has been found that the amount of improvement obtainable in this way is limited, particularly in an enclosed system; in practical devices, for example, it has been found that an output pressure of about 12 inches of water column is about the maximum obtainable by such design expedients, whereas output pressures of 28 inches of water column or more from the turbulence amplifier are required to operate the usual pneumatic or hydraulic power valve. In addition, the control sensitivity is poor and the residual output high in such a modified turbulence amplifier.

Furthermore, whether suitable for high or low-pressure use, previously-known types of turbulence amplifiers generally possess two other limitations. First, the turn-on time required for the amplifier output to reach its stable high-pressure state is quite widely variable in an uncontrolled manner, for example between 2 and 15 milliseconds. This characteristic severely limits the usefulness of such devices, particularly in high-speed circuits. Secondly, previously-known turbulence amplifiers are generally quite sensitive to noise, shock and vibration, which is detrimental to their operation in many practical industrial applications, for example.

Accordingly it is an object of the invention to provide a new and useful pure-fluid device.

It is also an object to provide a new and useful pure-fluid amplifier.

Another object is to provide an improved turbulence amplifier capable of producing higher output pressures and flow rates than previously-known turbulence amplifiers.

It is also an object to provide a new and useful turbulence amplifier which is capable of producing output pressures and flow rates suitable for operating conventional commercially-available pneumatic or hydraulic valves.

It is also an object to provide such a turbulence amplifier which is stable, has excellent volumetric efficiency, and can be operated and controlled by the output of a standard turbulence amplifier.

Another object is to provide a new and useful turbulence amplifier having a turn-on time which is shorter and more uniform than in previously-known types of turbulence amplifiers.

A further object is to provide a new and useful turbulence amplifier which is less sensitive to noise, shock and vibration than previously-known turbulence amplifiers.

*Summary of the invention*

In accordance with the invention, these and other objects are achieved by the provision of a device comprising means for projecting a fluid stream at least an initial portion of which is in a substantially laminar flow condition, means for receiving at least a portion of said stream, an intermediate conduit member disposed in the path of said projected stream between said projecting means and said receiving means and through which the projected stream travels, the interior cross-section of said intermediate conduit member substantially conforming to the cross-section of the projected stream applied thereto, and means upstream of said intermediate conduit member for controlling the position of the turbulence point of said projected stream downstream of said intermediate conduit member; the latter means preferably comprises means for applying a control stream to the projected stream between said projecting means and said intermediate conduit member. The supply pressure is normally adjusted so that the natural turbulence point of the projected stream lies just beyond the receiving means and so that with zero or low control-stream flow rates the flow rate and pressure at the receiving means are high, while application of a control-stream flow rate above a predetermined value causes the projected stream to become turbulent before it reaches the receiving means and is therefore effective to reduce greatly the flow rate and pressure at the receiving means. The resultant change in output pressure and flow rate is greater than the corresponding change in control stream pressure and flow rate so that amplification is obtained.

The device of the invention therefore differs from previously-known turbulence amplifiers in the addition of the intermediate conduit member. One effect of the intermediate conduit is to permit reliable, practical operation at much higher pressures and flow rates of the projected stream, and hence to provide much higher pressures and flow rates at the receiving means when the amplifier device is in its "ON" state. These output pressures and flow rates are sufficient to operate conventional, commercially-available pneumatic and hydraulic valves. Typically, the output pressures and flow rates are three or more times greater than the maximum obtainable with previously-known practical turbulence amplifiers. The increases in maximum output pressure and flow rate provided by the device of the invention also make possible the faster operation of the fluid-control valve actuated by the receiver output. The higher output pressures and flow rates also make it possible to utilize higher resistance devices in time delay circuits, and thereby secure longer time delays than were heretofore possible with turbulence amplifiers. In addition, it has been found that high volumetric efficiencies are obtained.

Furthermore, the presence of the intermediate conduit reduces the residual turbulence existing when the amplifier is in its "OFF" state; as a result, the laminar state is rapidly reestablished when the control stream turns the amplifier on, corresponding to a shortened and more uniform turn-on time. The intermediate conduit also in effect shortens the gap between the supply tube and collector, and thereby reduces the sensitivity of the amplifier to sound, shock and vibration. Both of these latter advantages are obtained even if the design parameters of the amplifier are selected so that the output pressure is rather low in absolute terms.

*Brief description of the drawings*

Other objects and features of the invention will be more readily comprehended from a consideration of the following detailed description, taken in conection with the accompanying drawings, in which.

*Description of the preferred embodiment*

Figure 1:
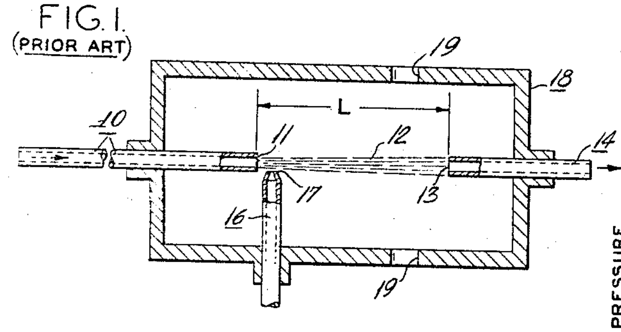
FIG. 1 (PRIOR ART)
FIGURE 1 is a schematic diagram of a previously-known type of standard turbulence amplifier.

Referring now to FIGURE 1, the figure illustrates schematically a standard turbulence amplifier of the prior art. It comprises a supply tube 10 for forming and projecting a fluid stream 12 from its outlet orifice 11, which in general may be a liquid or a gas and in the present example is assumed to be air. The stream 12 is directed at the inlet orifice 13 of a receiver which in this case comprises a collector tube 14. A control tube 16 is positioned to direct an air stream from its outlet orifice 17 against the projected stream 12 at a position just downstream of the supply tube orifice 11, and preferably at right angles thereto. In this example all three tubes are assumed to be cylindrical. The portions of the three tubes containing orifices 11, 13 and 17 are enclosed in an enclosure 18 filled with the same fluid as that used for the projected stream and the control stream, which in the present example is air; the enclosure is provided with appropriate vent holes 19.

Figure 2:
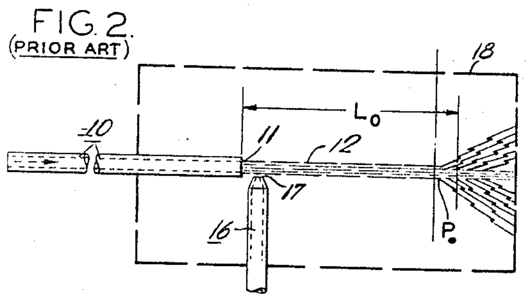
FIG. 2 (PRIOR ART)
FIGURE 2 is a schematic representation illustrating the point of natural turbulence of a projected stream, to which reference will be made in explaining the operation of turbulence amplifiers.
Figure 3:
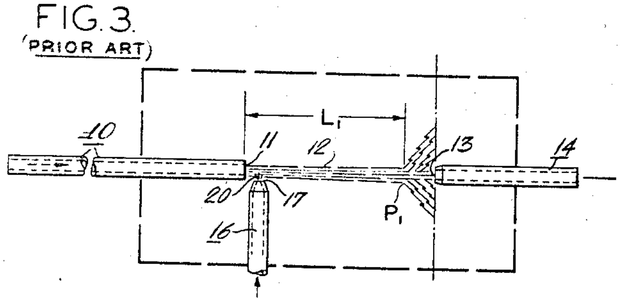
FIG. 3 (PRIOR ART)
FIGURE 3 is a schematic representation illustrating the effect of a control stream on the turbulence point in a turbulence amplifier of a previously-known type.

This type of pure-fluid amplifier relies upon the shifting upstream and downstream of the turbulence point in the projected stream 12 in response to changes in the flow of a control stream from control tube 16, as illustrated in FIGURES 2 and 3. FIGURE 2 illustrates a case in which the supply tube 10 projects a stream 12 in the absence of any control stream from control tube 16, and with the collector tube absent. In this case the projected stream 12 exhibits substantially laminar flow so that it remains well-defined, coherent and substantially nonturbulent until it reaches the natural turbulence point $P_0$, at which point it suddenly becomes highly turbulent and is scattered and dispersed. The length $L_0$ of the projected stream 12 from the supply tube orifice 11 to the point of turbulence $P_0$ is designated as the non-turbulent length of the projected stream. The turbulence point $P_0$ in FIGURE 2 is known as the natural point of turbulence because it occurs at the position shown in the absence of a control stream and in the absence of a collector tube. The collector tube orifice 13 shown in FIGURE 1 is preferably placed just slightly upstream of the natural turbulence point $P_0$ so that collector tube orifice 13 is impinged by the nonturbulent portion of stream 12, and a relatively large percentage, such as 50%, of the projected stream then flows through orifice 13 into the collector tube 14 to produce a relatively high pressure and flow rate therein.

FIGURE 3 illustrates the effect of applying a relatively strong control stream 20 through control tube orifice 17 to the projected stream 12. Control stream 20 causes the turbulence point to occur upstream at the point $P_1$, corresponding to a reduced nonturbulent length $L_1$. The turbulence point $P_1$ is now located upstream of the collector tube orifice 13, so that a large proportion of the projected stream is scattered and dispersed and only a small fraction thereof enters the collector orifice 13. Accordingly, by turning the control stream 20 on and off, or by varying it between a low and a high flow rate, the flow rate through the collector tube orifice 13 and the resultant pressure and flow rate in collector tube 14 can be varied between relatively high and relatively low values, the change in flow rate and pressure in the collector tube 14 being a number of times greater than the corresponding change in pressure and flow rate of the control stream. As a result, not only is a switching action provided but amplification of pressure changes is also produced.

A difficulty with the type of arrangement shown in FIGURE 1 is that the maximum pressure and rate of flow of the projected stream at the collector tube orifice 13 is often not as large as desired, and, in particular, is too small for the satisfactory actuation of the usual commercially-available fluid power valves. In an effort to increase the maximum collector tube pressure and flow rate by modifying the design of the turbulence amplifier, it is possible to increase the inner diameter of the supply tube 10 so that the projected stream has a larger cross-sectional area. However, the amount of improvement which can be obtained in this manner is limited, since if the diameter of a cylindrical supply tube 10 is increased much beyond a certain size, generally about 0.040 inch diameter, the laminarity of the projected stream decreases rapidly and the proportion of the projected stream collected by the collector tube orifice also decreases rapidly, and hence both the maximum output pressure obtainable and the degree of control by the control stream are decreased.

While it might be thought that this difficulty could be overcome by merely increasing the pressure of the air supplied to the supply tube 10 so as to produce a greater flow in the projected stream, there are also practical limits to the improvement which can be obtained in this manner. This is because the position of the turbulence point depends not only on the strength of the control stream but also on the strength of the supply stream. More particularly, referring to FIGURE 2, as the supply tube pressure is increased the point of natural turbulence $P_0$ moves upstream. If the supply tube pressure is increased by an amount such that even in the absence of a control stream the natural turbulence point $P_0$ occurs upstream of the collector tube orifice 13, for example at the position $P_1$ shown in FIGURE 3, the flow through collector tube orifice 13 will be reduced as though in response to the control stream, and application of a strong control stream will therefore have little or no effect on the collector tube pressure and flow rate; in other words, the amplifier output will always by "OFF."

Figure 4:
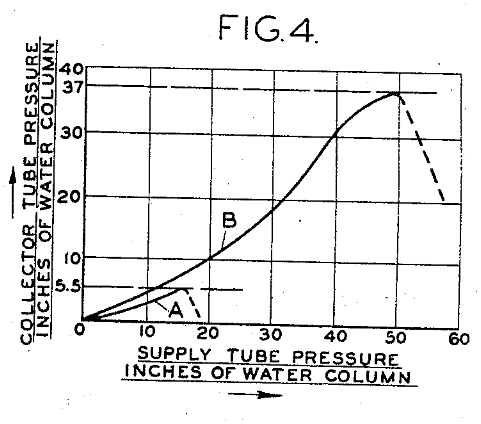
FIGURE 4 is a graphical representation showing by curves A and B the nature of the variation of output collector tube pressure with supply tube pressure for a prior-art turbulence amplifier such as is represented in FIGURE 1, and for a device of the invention such as is represented in FIGURES 6 and 7, respectively.

By way of example, curve A of FIGURE 4 is a graphical plot in which abscissae represent supply tube pressure in inches of water column and ordinates represent pressure in the collector tube in inches of water column in a standard typical prior-art turbulence amplifier. It will be seen from curve A that as the supply tube pressure is increased, the collector tube pressure increases to a maximum value, which in this example is about 5.5 inches of water column produced with a supply tube pressure of about 16 inches of water column. It is at this latter point that the natural turbulence point begins to move upstream of the collector tube orifice, so that the collector tube pressure thereafter decreases with further increases in supply tube pressure due to dispersal of the projected stream before it reaches the collector tube orifice. Accordingly the collector tube device beyond about 5.5 inches of water column merely by increasing the supply tube pressure.

Theoretically it would seem possible to move the collector tube orifice upstream as higher supply tube pressures are utilized so as to keep the point of natural turbulence downstream of the collector tube orifice. However, the extent of improvement obtainable in this way is limited not only by the necessity of providing sufficient room for the control stream to act on the emerging stream from the supply tube, but also by the fact that, as the collector tube orifice is moved closer and closer to the supply tube orifice, the projected stream exhibits a heightened degree of turbulence over and above that due to the normally-expected decrease in the nonturbulent length of the projected stream. This is apparently due in large measure to interference with the normal free flow of the surrounding air in the region of the projected stream when the supply orifice, control orifice and receiver orifice are closely bunched together, particularly where, as is ordinarily necessary in a practical device, the structure is enclosed so as to further limit the free flow of the surrounding air. In addition, the control sensitivity decreases and the residual pressure (i.e., the output pressure when the device is "OFF") increases markedly when the collector tube orifice is moved very close to the supply tube orifice in an effort to increase greatly the maximum output pressure and flow rate. In any event, it has been found that the maximum collector tube pressure obtainable in practical embodiments of such prior-art turbulence amplifiers by such design expedients is typically about 12 inches of water column.

Figure 5:
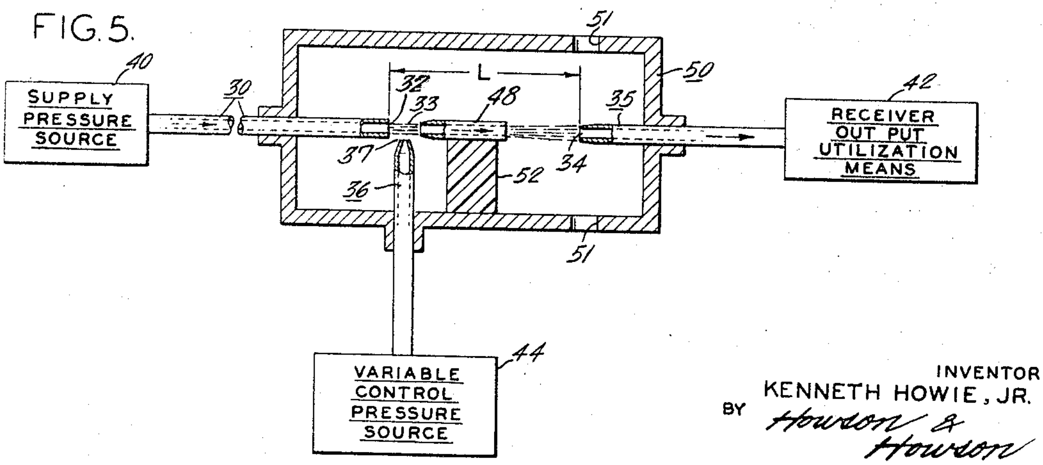
FIGURE 5 is a schematic view illustrating one embodiment of the invention.

FIGURE 5 shows schematically one form of device in accordance with the invention by means of which it is practical to increase greatly the maximum output pressure and flow rate. In this device there is employed means in the form of a supply tube 30 for projecting from supply tube orifice 32 thereof a fluid stream 33 at least the initial portion of which is in a substantially laminar flow state in that it has a coherent, well-defined, and substantially nondispersed form. The center of stream 33 is directed toward the center of inlet orifice 34 of a receiving means in the form of collector tube 35 aligned and coaxial with supply tube 30. A control tube 36 is positioned with its outlet orifice 37 adjacent supply tube orifice 32 so that a control stream may be directed against the projected stream substantially at right angles thereto and immediately adjacent supply tube orifice 32, and constitutes means for varying the position of the turbulence point of projected stream 33 adjacent collector tube inlet orifice 34. Also shown are a supply pressure source 40 connected to supply tube 30 to provide the requisite fluid under pressure thereto; receiver output utilization means 42 connected to the outlet of collector tube 35 to receive and utilize the fluid flow and fluid pressure produced in collector tube 35; and a variable control pressure source 44 connected to control tube 36 and capable of providing a control stream of variable flow rate and pressure to control tube 36. For convenience in comparison, it is assumed in this example that the supply tube, collector tube and control tube are like those in the previously-known device of FIGURE 1, and that the gap length L from the supply tube orifice 32 to the collector tube orifice 34 is also the same as in the standard turbulence amplifier of FIGURE 1.

While the above-described elements of FIGURE 5 are similar to corresponding elements in previously-known turbulence amplifiers, the device of FIGURE 5 differs importantly in including an intermediate conduit member 48 positioned between and aligned with supply tube 30 and collector tube 35 and spaced from each of them, the spacing from orifice 32 of supply tube 30 being sufficient to permit the introduction of a control stream from control tube 36. In this example the intermediate conduit member 48 is a cylindrical tube having substantially the same inner cross-section as supply tube 30 and collector tube 35. A suitable enclosure 50 may again be employed which shields and supports the control tube, the supply tube, the collector tube and the intermediate conduit, the intermediate conduit 48 being mounted on an inward projection 52 of the enclosure. The region in enclosure 50 near control tube orifice 37 may be considered as a control chamber and that near collector tube orifice 34 as a collector or receiver chamber, although in the present example these chambers are not structurally separated or defined by the enclosure. Suitable vent openings 51 are also provided through the enclosure 50 communicating with the collector chamber.

In typical operation of the embodiment of the invention shown in FIGURE 5, supply pressure source 40 causes a substantially-laminar projected stream 33 to be projected at a uniform flow rate from supply tube orifice 32 toward the center of collector tube orifice 34, the projected stream 33 passing through intermediate conduit member 48 in its travel to the collector tube. In the absence of a control stream from control tube 36, the projected stream 33 reaches collector tube orifice 34 without breaking into turbulence, despite the use of very high supply tube pressures, i.e., the nonturbulent length of the projected stream is greater than the gap length. This capability is illustrated in curve B of FIGURE 4, wherein it is assumed that the fluid medium is again air. As can be seen from this figure, the supply tube pressure can be raised to a very much higher value before the turbulence point moves upstream of the collector tube orifice than was the case for the prior-art turbulence amplifier represented by curve A. More particularly, in the device of the invention the output pressure rises with increases in supply pressure up to a supply pressure of about 37 inches of water column, as compared with the maximum obtainable with the prior-art turbulence amplifier of about 5.5 inches of water column. It is recalled that the coordinate values shown in FIGURE 4 are for a device in accordance with the invention in which the total distance between supply-tube orifice and collector-tube orifice are the same as for the standard turbulence amplifier of FIGURE 1 whose characteristic is shown in curve A, and the sizes of the supply tube, control tube and receiver tube are also the same. It is noted that the maximum collector tube output pressure obtainable with the device of the invention is at least seven times that for the prior-art device, and is at least three times the maximum obtainable from a practical redesign of the standard turbulence amplifier referred to above. Significantly, it is greater by about 10 inches of water column than that required to actuate the usual power valve.

Figure 8:
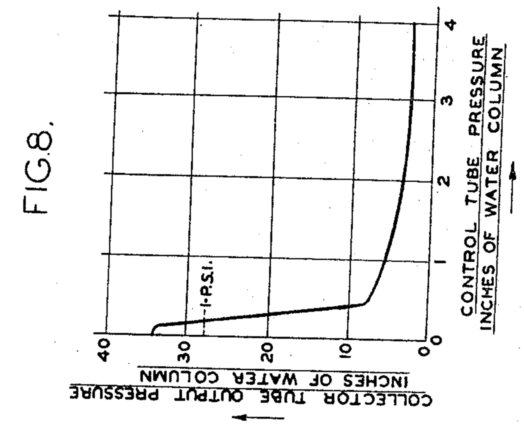
FIGURE 8 is a graphical representation illustrating the variation of collector output pressure with control tube pressure in one embodiment of the invention.

Now when the control stream is emitted from the control tube 36 to impinge the projected stream 33, at a sufficient flow rate as set forth hereinafter, the turbulence point of the projected stream moves upstream of the collector tube orifice 34 so that, as in the case of the turbulence amplifier of the prior art, the collector tube pressure falls markedly. A typical control characteristic for the device of the invention is shown in FIGURE 8, wherein abscissae represent control tube pressure in inches of water column and ordinates represent collector tube output pressure in inches of water column. The supply tube volume in this example is about 4 cubic feet per hour of air. As can be seen, when the control pressure is zero or very small, the output pressure is very high, in this example about 34 inches of water column. When the control pressure is increased above a few tenths of an inch of water column, the output pressure begins to fall off rapidly, and at control pressures of about 1 to 2 inches of water column has fallen to about 5 inches of water column. With further increases in control pressure, the output pressure decreases somewhat further, reaching a minimum or residual pressure of about 3 inches of water column, achieved at control pressures of about 3 to 4 inches of water column.

It will therefore be seen that by switching the control pressure from substantially zero to 4 inches of water column, the output pressure can be switched from about 34 inches to 3 inches of water column. Not only is the output pressure change many times greater than the corresponding control pressure change, but the high value of the output pressure is sufficient to operate the usual commercially-available power valves; most such valves require about one pound per square inch, or about 28 inches of water column, for actuation. Furthermore, the pressure required to turn off the device, i.e., reduce the output pressure to its residual value, is only three or four inches of water column, well within the output capabilities of a standard turbulence amplifier. Accordingly the device of the invention serves admirably as a pure-fluid output amplifier capable of responding to the output of a standard turbulence amplifier to actuate a power valve, without requiring any intervening mechanically-moving parts.

It will be understood that the above performance figures are merely by way of example. Other embodiments may produce output pressures as high as 100 inches of water column, particularly where special care is taken to assure that the interior of the supply tube is smooth and straight and that the conduit leading to the supply tube is free of severe discontinuities in its inner surface. Furthermore in many embodiments the residual pressure can be reduced below three inches of water column by appropriate selection of the configuration and placement of the vents.

Figure 10:
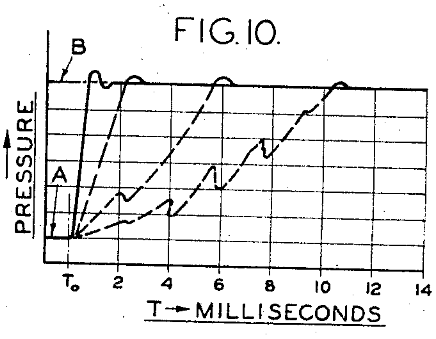
FIGURE 10 is a graphical representation to which reference will be made in explaining certain advantages of the invention.

The improvement in turn-on time characteristics is illustrated in FIGURE 10, wherein ordinates represent amplifier output pressure and abscissae represent time. Assume that prior to the time $T_0$ the control stream has been OFF (lower-pressure condition) for some time and is switched to its ON (higher-pressure condition) at time $T_0$. The solid curve illustrates the manner in which the output pressure of a typical amplifier of the invention then rises from its initial low value A to its final value B. In this example the output pressure reaches its final value in about 0.8 millisecond (which is its turn-on time), and does so reproducibly and predictably. The broken-line curves indicate the different ways in which the output pressure of a typical prior-art turbulence amplifier may change under similar circumstances, assuming the same initial output pressure A and the same final pressure B. As shown, for the prior-art turbulence amplifier the turn-on time is widely and unpredicatably variable, e.g., from about 2 to 15 milliseconds, and in general is larger than for the device of the invention. Accordingly, even if an amplifier of the invention is designed and operates so as to have OFF and ON output pressures about the same as that of a prior-art type of turbulence amplifier, it will provide advantages of shortened and more uniform turn-on time. In addition, it possesses the above-mentioned advantages of lessened sensitivity to noise, shock and vibration.

Figure 6:
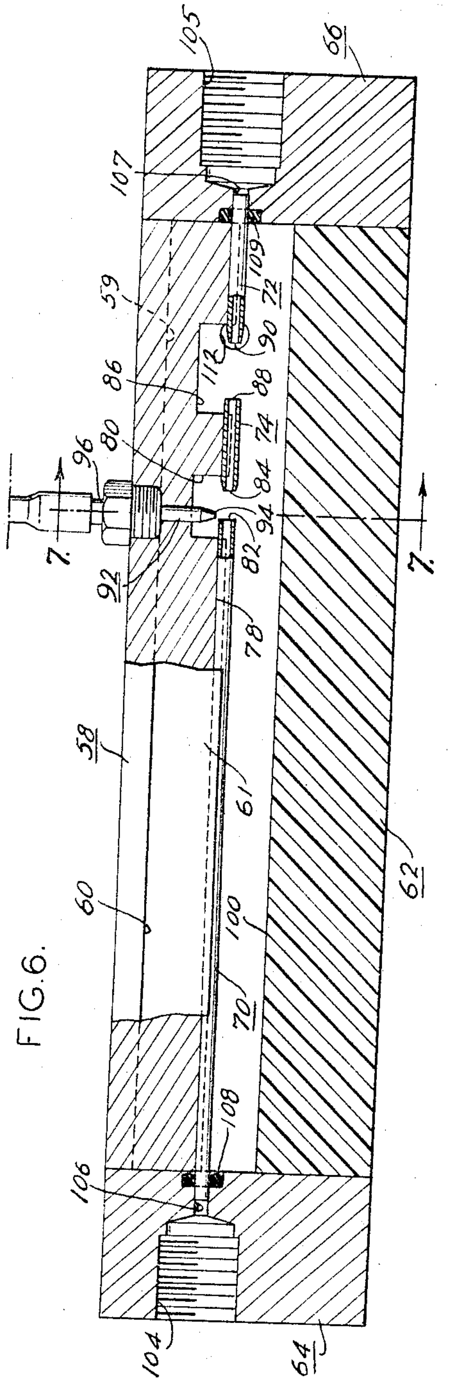
FIGURE 6 is a longitudinal sectional view of one form of a device constructed in accordance with the invention.
Figure 7:
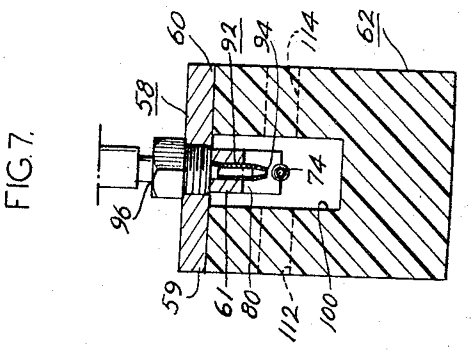
FIGURE 7 is a cross-sectional view taken along lines 7—7 of FIGURE 5.

The particular operating characteristics shown in FIGURE 8 and in curve B of FIGURE 4 are obtainable with the specific embodiment of the invention shown in detail in FIGURES 6 and 7.

Referring to the latter figures, the particular device shown therein comprises a longitudinally-extending support chamber 58 of T-shaped cross-section in which flanges 59 and 60 constitute arm members of the T and the downwardly-extending boss 61 constitutes the stem portion of the T. A main body portion 62 and a pair of end caps 64 and 66 are secured to the support member 58 and to each other in the positions shown.

The T-shaped support member 58, which may be of a suitable metal such as brass, carries and supports the supply tube 70, the collector tube 72 and the intermediate conduit member 74, each of which may be pressed into and soldered to a groove 78 running the length of the lower surface of the stem portion 61 of the T-shaped support member, so as to be accurately aligned with each other. The material of the T-shaped support member 58 is cut back to form a control chamber 80 between the supply tube orifice 82 and the inlet orifice 84 of the intermediate conduit member 74, and is also cut away to form a collector chamber 86 between the outlet end 88 of intermediate conduit member 74 and the inlet orifice 90 of collector tube 72. The outer surfaces of the inlet ends of intermediate conduit member 74 and of collector tube 90 are preferably tapered and all surfaces to be contacted by the projected stream are smooth and free of burrs. The supply tube, intermediate conduit and collector tube are all straight, have cylindrical central openings of the same diameter, and all have their orifices at right angles to their common longitudinal axis.

The control tube 92 is mounted on T-shaped support member 58 in a vertical bore through stem 61 thereof which extends from the exterior to the control chamber 80. Control tube 92, having a cylindrical inner bore, is positioned with its orifice 94 adjacent and normal to the supply tube orifice 82. Preferably its inner diameter is tapered down adjacent its orifice 94. A suitable control tube pneumatic fitting 96 is provided for connection to the control pressure source.

The main body member 62 is in the form of a block, which may be of Bakelite having therein a longitudinally-extending rectangular channel 100 opening to its upper surface. The lengths and widths of the main body member 62 and of the support member 58 are the same, and the width and depth of channel 100 are greater than the width and depth of the stem 61 of the T of support member 58, so that when the opposite arms 59 and 60 of the T are placed on and aligned with the upper surface of main body 62, the supply tube, intermediate conduit member, collector tube, and the orifice of the control tube all lie within channel 100. The support member 58 and the main body member 62 may be secured together by suitable screws.

End caps 64 and 66 are provided with longitudinally-extending apertures 104 and 105, respectively, which are internally threaded to receive suitable pressure connectors for connection to the supply source and the receiver utilization means, respectively. The apertures 104 and 105 extend only part way through the end caps, smaller-diameter coaxial bores 106 and 107 being provided between the bottoms of the apertures 104 and 105 and the opposite sides of the end caps. The bore 106 is of a size to receive the end of supply tube 70 and the bore 107 is of a size to receive the end of collector tube 72. Suitable resilient O-rings 108, 109 may be provided in recesses in the end caps 64, 66, respectively, to provide pneumatic sealing when the end caps are secured in place, as by screws.

A pair of vents in the form of bore holes 112 and 114 are provided through opposite side walls of main body member 62, from collector chamber 86 to the exterior to permit exhaust of the scattered air flow produced when the projected stream becomes turbulent.

In operation, a steady source of pressurized supply air is supplied to the left-hand end of supply tube 70 by way of a connector which is screwed into threaded aperture 104. A similar connector is screwed into aperture 105 at the right-hand end of collector 72, and will normally be connected by way of an appropriate pneumatic line to the control input of a pneumatic power valve. The supply pressure is adjusted so that a substantially laminar stream of air is emitted from supply tube orifice 82, passes in sequence through the air gap between supply tube 70 and intermediate conduit 74, through inlet 84, through the interior of intermediate conduit 74, and into inlet 90 of collector tube 72. The supply pressure is ordinarily made as high as is possible without causing the projected stream to become turbulent before reaching the inlet 90 of collector tube 72. With no fluid flow through control tube 92, the projected air stream from the supply tube reaches the collector inlet 90 in coherent, well-defined form due to the substantially laminar, non-turbulent flow. Ordinarily there is a slight spreading of the projected stream before it reaches the inlet of collector tube 72, so that the collector tube typically collects about 75% of the total projected stream, the remainder flowing out the vents 112 and 114. Under these conditions the flow rate into the collector tube 72 and the resultant pressure therein are high, typically about 34 inches of water column at a flow rate of about 3 cubic feet per hour, and therefore sufficient to operate rapidly an air-controlled pneumatic power valve connected thereto.

The control tube fitting 96 is connected by an appropriate pneumatic line to a source of controlledly-variable air pressure, such as the output of a standard turbulence amplifier. The reduced inner dimension of control tube 92 near its outlet orifice is normally provided to increase the resistance of the control tube, so that a number of such devices may be operated in parallel from a single standard turbulence amplifier When the air pressure supplied to control tube 92 is increased to about 3 or 4 inches of water column, the action which exerts on the projected stream adjacent supply tube outlet orifice 82 causes the projected stream to become turbulent somewhat upstream of collector tube orifice 90 and therefore to disperse so that only a small fraction of the total stream is collected by the collector tube 72 even though there is no appreciable deflection of the projected stream by the control stream. The result is a drop in collector tube output pressure to about 3 inches of water column, which permits the air-controlled pneumatic power valve connected thereto to become deactuated.

In a typical embodiment, the supply tube 70, the intermediate conduit 74 and the collector tube 72 may each have an outer diameter of about 0.062 inch and an inner diameter of about 0.030 inch, control tube 92 may have an outer diameter of about 0.062 inch and an inner diameter of about 0.030 inch, except near its outlet orifice where it tapers to an inner diameter of about 0.010 inch. Supply tube 70 may be about 2$\frac{13}{16}$ inches long, intermediate conduit 74 about 0.360 inch long, and collector tube 72 about 1$\frac{1}{16}$ inches long and control tube 92 about $\frac{3}{4}$ inch long. The spacing between supply tube 70 and intermediate conduit 74 may be about $\frac{3}{32}$ inch and the spacing between intermediate conduit 74 and collector tube 72 may be about $\frac{1}{4}$ inch. The exterior of the inlet ends of intermediate conduit 74 and of collector tube 72 are preferably tapered or bevelled to eliminate small unwanted turbulences. In some cases (not shown) the inlet and outlet ends of the interior passage in supply tube 70 and the outlet end of the interior passage of the intermediate conduit may be smoothly flared or enlarged to enhance the smoothness of flow of the air stream.

In addition to providing the above-described and graphically-represented high output pressures and flow rate, the specific embodiment of the invention shown in FIG- URES 6 and 7 exhibits a volumetric efficiency of about 75% as compared to a usual volumetric efficiency of about 48% for the standard turbulence amplifier.

While the precise theory of why the device of the invention operates exactly as it does is not fully understood, it appears that at least a substantial portion of the advantages realized are due to the action of the intermediate conduit member in shielding the projected stream from the surrounding fluid thereby minimizing the disturbing effects of entrainment of surrounding fluid into the projected stream and also minimizing the effects of any nearby walls of the enclosure on the flow of the surrounding medium, which is air in the representative embodiment.

It will be understood that the particular construction shown in FIGURES 6 and 7 is merely by way of example. While it employs cylindrical tubes for the various conduits, these may be of other cross-sectional forms and constituted in other ways; for example, the conduits may all have rectangular or other cross-sections, and comprise channels, cavities and orifices formed in plastic or metal blocks by methods such as etching, molding, stamping or machining to form the necessary fluid passages. Multiple control conduits may be used, placed on the same or on opposite sides of the projected stream, instead of the single control conduit shown. The control chamber and the collector chamber need not communicate directly with each other, except through the intermediate conduit, and the control chamber may be made extremely small so as to provide in essence only room for the projected stream to pass from supply tube to the intermediate tube. However, some form of venting of the control chamber to the atmosphere should be provided, either directly or by way of the collector chamber for example.

As a guide to the designer in applying the invention to various purposes and uses, the following discussion of the effects of various of the parameters of the device is provided.

For best results in obtaining full output pressure, axial alignment of the intermediate conduit with the supply tube and the collector tube should be held to close tolerances, preferably within about 0.001 inch and almost always within 0.010 inch. The inner cross-sections of supply tube, intermediate conduit member and collector tube are preferably substantially identical in shape and size; for cylindrical cross-sections the diameter is preferably the same within about 0.002 inch, greater variations tending to destroy the laminarity of the projected stream. Inlet and outlet orifices of the intermediate conduit member should be smooth and free from burrs and other irregularities lest the laminarity of the stream be adversely affected. The outlet orifice of the intermediate conduit member and that of the supply tube should be perpendicular to the projected stream, since an angular bias of either orifice of as little as 1° may significantly bend the projected stream away from its intended straight-line trajectory and substantially reduce the flow into the collector tube.

The exact longitudinal position of the intermediate conduit member is not highly critical, so long as the spacing between supply tube and intermediate conduit is large enough to permit unimpeded application of the control stream to the projected stream and so long as a sufficient gap (typically at least ¼ inch) is left between the intermediate member and the collector tube to permit adequate venting.

Neither is the exact length of the intermediate conduit member highly critical, so long as the above-described gaps or spacings are provided. Lengthening of the intermediate conduit member generally increases the collector tube output pressure, but tends also to increase the required control pressure and the residual pressure; shortening of the intermediate conduit member has the opposite effect. Accordingly, by changing the length of the intermediate conduit member the designer can readily vary the performance characteristics to optimize them for any specific application.

As in the case of the standard turbulence amplifier, the existence of a continuous change in output pressure between the "ON" and "OFF" states in response to control pressure variations offers the opportunity for so-called linear or small-signal amplification of control pressures by the device of the invention, but such operation tends to be quite critical in the present state of development and most advantageous operation is realized in the switching or "ON-OFF" mode.

Departing now from the description of a particular preferred form of the device of the invention in which the advantages of the invention are most fully realized, in general any suitable means may be employed for forming the supply stream so long as it is capable of projecting a stream which, in the absence of a control stream, is substantially laminar until it reaches the vicinity of the collector inlet orifice and which is capable of being rendered turbulent before reaching the collector orifice by means acting upstream of the intermediate conduit member. A variety of means may be employed upstream of the intermediate conduit for introducing into the projected stream the turbulence-inducing effect which causes turbulence downstream of the intermediate conduit member. The receiver of the projected stream need not in all cases be a collector tube nor axially aligned with the projected stream, so long as it is capable of sensing the degree of turbulence of the projected stream; for example, electrical, mechanical or piezoelectric transducers, on or off center of the projected stream, may serve as receivers in some cases, although not always equally advantageously. The fluids employed for the projected stream, for the control stream and for the ambient medium through which these streams flow are preferably all of the same substance, but variation is also possible in this respect; generally these fluids should all be in the same state, i.e., all liquid or all gaseous, although different liquids or different gases of similar densities and compressibilities may generally be used without substantial degradation of operating characteristics; for example, nitrogen streams in an ambient medium of air will operate very satisfactorily.

Figure 9:
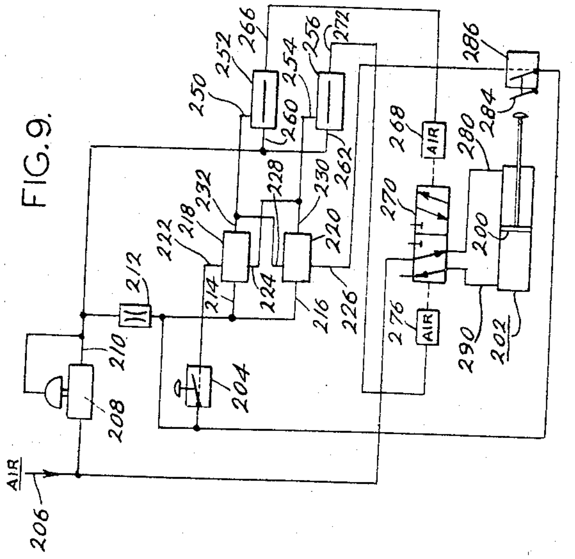
FIGURE 9 is a schematic diagram showing an arrangement utilizing an amplifier in accordance with the invention to operate a conventional power valve.

FIGURE 9 is a schematic representation of a system utilizing a pair of high-pressure turbulence amplifiers constructed in accordance with the invention to control the motion of a piston 200 in a double-acting air cylinder 202 in response to operation of a manually-operable push-button air valve 204. The arrangement is such that the piston 200 normally rests in its left-hand position in the figure, but responds to momentary operation of push-button valve 204 to go through one cycle of operation during which it moves to its right-hand position and then returns to its left-hand position.

More particularly, air under pressure is supplied by way of pneumatic supply line 206 to a conventional pressure regulator 208, the outlet line 210 of which is connected back to a control element of the regulator in the usual way so that the air pressure at outlet line 210 is maintained substantially constant and somewhat lower than the pressure in pneumatic supply line 206. Outlet line 210 is connected by way of a conventional fixed pressure-reducer 212 to the supply tube inlets 214 and 216 of standard turbulence amplifiers 218 and 220. Turbulence amplifier 218 has a first control-tube inlet line 222 and a second control-tube inlet line 224, an increase in pressure in either of the control-tube inlet lines serving to shut off the turbulence amplifier 218. Similarly, turbulence amplifier 220 has a first control-tube inlet line 226 and a second control-tube inlet line 228, an increase in pressure in either of the latter control-tube inlet lines being effective to turn off the standard turbulence amplifier 220. Turbulence amplifiers 218 and 220 are cross-connected in flip-flop fashion, i.e., outlet line 230 of turbulence amplifier 220 is directly connected to control-tube inlet line 224 of turbulence amplifier 218, and outlet line 232 of turbulence amplifier 218 is directly connected to control-tube inlet line 228 of turbulence amplifier 220. This well-known circuit arrangement is characterized in that a momentary increase in pressure applied to control-tube inlet line 222 will place the flip-flop in a condition for which turbulence amplifier 220 is on and turbulence amplifier 218 off, in which condition the flip-flop remains until a momentary increase in the pressure applied to control-tube inlet line 226 causes turbulence amplifier 220 to turn off and turbulence amplifier 218 to turn on.

Outlet line 232 of standard turbulence amplifier 218 is connected to the control-tube inlet line 250 of a first high-pressure turbulence amplifier 252 constructed in accordance with the present invention. Similarly, the outlet line 230 of turbulence amplifier 220 is connected to the control-tube inlet line 254 of another high-pressure turbulence amplifier 256, also constructed in accordance with the present invention. The supply tube inlet lines 260 and 262 of amplifiers 252 and 256 are provided with supply-tube operating pressure from regulator outlet line 210.

The outlet line 266 of high-pressure turbulence amplifier 252 is connected to one control chamber 268 of the five-port, four-way air-actuated power valve 270, while the outlet line 272 of high-pressure turbulence amplifier 256 is connected to the other control chamber 276 of the valve 270. Air valve 270 has two positions, the position represented in the drawing being such that air from pneumatic supply line 206 passes through valve 270 to line 280 which communicates with the interior of cylinder 202 on the right-hand side of piston 200 so that the latter piston is moved to its left-hand position. This is the condition of valve 270 when high-pressure turbulence amplifier 252 applies a high output pressure to control chamber 268, and represents the normal state of the circuit. However, when pushbutton control valve 204 is manually depressed momentarily, an increase in pressure is applied to control-tube inlet line 222 of standard turbulence amplifier 218, which causes the turbulence amplifier flip-flop to change to its other state in which high output pressure from high-pressure turbulence amplifier 256 is supplied to control chamber 276. This causes air valve 270 to shift to its alternate position in which pressure from pneumatic line 206 is conveyed by way of line 290 to the left-hand side of piston 200, moving the latter piston toward the right; this state persists even though the pushbutton valve 204 is released. Piston 200 continues to move to the right until it contacts and operates the contacting element 284 of a fluidic normally-open (nontransmissive) limit switch 286 so as to close the latter limit switch and supply pneumatic pressure from pressure reducer 212 to control-tube inlet line 226 of standard turbulence amplifier 220. The latter pressure causes the turbulence amplifier flip-flop to revert to its initial condition, thereby causing air pressure to be again applied to the right-hand side of piston 200, driving it back to its left-hand position. In this way the above-indicated overall cyclic operation of the air cylinder is achieved by means of high-pressure turbulence amplifiers constructed in accordance with the invention, which are operated by standard turbulence amplifiers and in turn operate a standard pneumatic power valve.

While the invention has been described with particular reference to specific embodiments thereof, it will be understood that it can be embodied in any of a large variety of forms without departing from the spirit and scope of the invention as defined by the appended claims.

I claim:

1. A fluid-operated device, comprising:
means for projecting a fluid stream, at least an initial portion of which is in a substantially laminar flow condition;

means for receiving at least a portion of said projected stream;
an intermediate conduit member between and spaced from said projecting means and said receiving means, disposed in the path of and aligned with said initial portion of said projected stream so that said projected stream passes through it, the interior cross-section of said intermediate conduit member being substantially the same in size and shape as the cross-section of said projected stream supplied thereto; and
means upstream of said intermediate conduit member for varying the location of the point of turbulence of said projected stream between different positions downstream of said intermediate conduit member.

2. The device of claim 1, in which said last-named means comprises means for forming and directing a control stream of fluid against said projected stream between said projecting means and said intermediate conduit.

3. The device of claim 1, in which said fluid is a gas and said stream travels through a gaseous medium.

4. A pure-fluid amplifier, comprising:
a supply conduit for projecting a stream of fluid, at least an initial portion of which is in a substantially laminar flow condition;
a collector conduit for receiving at least a portion of said stream of fluid;
an intermediate conduit between and spaced from said supply conduit and said collector conduit and aligned therewith, so that said projected stream passes through said intermediate conduit, the inner cross-section of said intermediate conduit being substantially the same as that of said projected stream passing through it; and
a control aperture for applying a control stream of fluid to said projected stream between said supply conduit and said intermediate conduit to control the point downstream of said intermediate conduit at which said projected stream becomes turbulent.

5. A pure-fluid device, comprising:
means for projecting a stream of fluid, at least the initial portion of which is in a substantially laminar flow condition;
means spaced from said projecting means for receiving at least a portion of said projected stream;
an intermediate conduit member disposed between and spaced from said projecting means and said receiving means in the path of said projected stream so that said stream passes through said conduit, said conduit having a cross section transverse to said stream such that said stream substantially fills said conduit member; and
means for applying a stream of a fluid to said projected stream at a point intermediate said projecting means and said intermediate conduit member to control the position of the point downstream of said intermediate conduit member at which said projected stream becomes turbulent.

6. A pure-fluid device, comprising:
a supply conduit for forming and projecting a fluid stream, at least an initial portion of said stream being in a substantially laminar flow condition;
a collector conduit disposed with its inlet orifice in the path of said projected stream so that different amounts of said stream enter said inlet orifice depending upon the location with respect to said inlet orifice of the turbulence point of said stream;
an intermediate conduit member disposed between and spaced from said supply conduit and said collector conduit so that said projected stream passes through said intermediate conduit in traveling from said supply conduit to said collector conduit, said intermediate conduit having a cross-section sufficiently small to be substantially completely filled by said projected stream; and means for applying to said projected stream a control stream of a fluid similar to the fluid of said projected stream, said control stream intersecting said projected stream at an angle thereto and between said supply conduit and said intermediate conduit member, whereby the position of the turbulence point of said projected stream is varied between different positions downstream of said intermediate conduit.

7. The device of claim 1, in which said receiving means is responsive to changes in said received portion of said stream to produce an output signal.

8. The device of claim 1, comprising means for venting the region through which said stream travels from said intermediate conduit to said receiving means.

9. The device of claim 1, in which said means upstream of said conduit member is effective to vary the location of said point of turbulence without substantially deflecting said stream.

References Cited

UNITED STATES PATENTS

| | | | |
|---|---|---|---|
| 1,205,530 | 11/1916 | Hall | 137—81.5 |
| 1,628,723 | 5/1927 | Hall | 137—81.5 |
| 3,234,955 | 2/1966 | Auger | 137—81.5 |
| 3,279,489 | 10/1966 | Bjornsen et al. | 137—81.5 |
| 3,334,641 | 8/1967 | Bjornsen | 137—81.5 |

M. CARY NELSON, *Primary Examiner.*

W. R. CLINE, *Assistant Examiner.*